United States Patent [19]

Shimizu et al.

[11] Patent Number: 6,022,519
[45] Date of Patent: Feb. 8, 2000

[54] METHOD OF MANUFACTURING CRYSTALLINE MICROPOROUS MATERIAL

[75] Inventors: Shinichi Shimizu, Ryugasaki; Fujio Mizukami; Yoshimichi Kiyozumi, both of Tsukuba, all of Japan

[73] Assignees: Kuboto Corporation; Japan as represented by Director General of Agency of Industrial Science and Technology, both of Japan

[21] Appl. No.: 09/322,687

[22] Filed: May 28, 1999

Related U.S. Application Data

[63] Continuation of application No. 08/649,590, filed as application No. PCT/JP95/01985, Sep. 28, 1995.

[30] Foreign Application Priority Data

May 24, 1995 [JP] Japan ................................. 7-125040
May 24, 1995 [JP] Japan ................................. 7-125041

[51] Int. Cl.[7] ...................... C01B 33/021; C01B 39/02; C01B 39/40; C01B 39/36; C01B 39/26
[52] U.S. Cl. ...................... 423/700; 423/705; 423/706; 423/716; 423/717; 423/335; 423/DIG. 22; 423/DIG. 25; 423/DIG. 29
[58] Field of Search ................ 423/70, 702, 704, 423/705, 706, 712, 716, 717, DIG. 22, DIG. 25, DIG. 29, 335

[56] References Cited

U.S. PATENT DOCUMENTS 3,094,383  6/1963  Dzierzanowsky et al. ............ 423/712
4,160,011  7/1979  Estes .
5,110,573  5/1992  Johnson et al. .

*Primary Examiner*—Mark L. Bell
*Assistant Examiner*—David Sample
*Attorney, Agent, or Firm*—Fulbright & Jaworski, LLP

[57] ABSTRACT

A method of manufacturing crystalline microporous material suitable for manufacturing a variety of crystalline microporous material under mild reaction conditions and under safe working environmental conditions by using simple installation. The crystalline microporous materials obtained by the present invention may be used as adsorbent agent, catalyst or separating material. According to the characterizing features of the manufacturing method of the present invention, there are provided a method of using cation compound or amine as crystallizing modifier and using, in combination, raw material including canemite or silicon dioxide and a further method using raw material including silicon dioxide and aluminum salt. The method includes a step of mixing these components, a solid-liquid separating step for separating produced fine particles, and a crystallizing step for crystallizing the separated solid component. The invention achieves improvement in safety, economy and so on, in comparison with the coventionally practiced hydrothermal synthesis method which requires severe reaction conditions of high-temperature, high-pressure and strong alkaline. Further, the method allows freedom in adjustment of the pore diameter and allows a higher proportion of porous structure to be maintained in a product when the material is formed into a molded product.

18 Claims, No Drawings

METHOD OF MANUFACTURING CRYSTALLINE MICROPOROUS MATERIAL

This is a continuation of application Ser. No. 08/649,590 filed May 21, 1996, now abandoned which is a 371 of PCT/JP95/01985, filed Sep. 28, 1995.

FIELD OF THE INVENTION

The present invention relates to a method of manufacturing crystalline microporous material, and the invention relates more particularly to a method suitable for manufacturing a variety of crystalline microporous material under mild reaction conditions and under safe working environmental conditions by using simple installation. The crystalline microporous materials obtained by the present invention may be used as adsorbing agent, catalyst carrier or the like.

BACKGROUND OF THE INVENTION

Crystalline microporous material exist naturally in many kinds such as mordenite, ferrierite. Further, many kinds of artificial crystalline microporous material are known such as Zeolite-A, Zeolite-X, ZSM-Z5 (see Japanese patent Kokoku No. 46-10064), and ZSM-11 (see Japanese patent Kokoku No. 53-23280) and so on.

For manufacturing the artificial crystalline microporous material as mentioned above, there has been employed a method commonly referred to as "hydrothermal synthesis method" which includes a mixing step for obtaining alkaline mixture liquid containing silicon dioxide ($SiO_2$), aluminum oxide, and organic ammonium salt, and a subsequent crystallizing step for crystallizing crystalline microporous material in the inorganic material mixture liquid by means of high-pressure heating.

That is, according to the hydrothermal method, it has been believed that after the preparation of the mixture liquid the crystallizing step by heating needs to be effected with the solid mixture component thereof being in the liquid. Thus, for obtaining the high-temperature and high-pressure conditions needed for the crystallization, it has been necessary to place the mixture liquid in the form of liquid within a high-pressure heating container (autoclave) and then to heat it.

With the conventional hydrothermal synthesis method described above, the high-pressure heating container is expensive. Also, since the inorganic mixture liquid contains alkaline metal oxide or alkaline earth metal oxide as oxide or hydroxide component thereof, the liquid is strongly alkaline. Therefore, for preventing corrosion due to the strong alkaline, it has been necessary for the high-pressure heating container to be made of e.g. stainless steel or to be provided with fluorine resin surface treatment. In these manners, the method involves many factors which may increase the manufacturing costs in terms of the manufacturing installation. In addition, in handling of such strong alkaline mixture liquid as described above, it has been necessary to take some appropriate and sufficient measure for the safety of the worker engaged in this operation. Therefore, the method may be considered as a very expensive synthesis method from the view point of safety of the installation also.

Further, according to the hydrothermal synthesis method, the crystallizing step thereof requires severe reaction conditions of heating the mixture liquid at a high temperature condition normally at 70° C. to 200° C. or even higher in some cases for a long period extended over a few days or even more than 10 days. This too has contributed to further increase in the manufacturing costs.

Still further, in a small-scale research and development too, the use of the strong alkaline mixture liquid under such high-temperature, high-pressure conditions does not allow the use of ordinary glass container. So, there has been a demand for an improved method which allows inexpensive synthesis of crystalline microporous material under milder conditions.

In addition to the above, the crystalline microporous material obtained by the hydrothermal synthesis is in the form of fine particles, which needs to be molded depending on its application. Yet, the crystalline microporous material in the form of fine particles does not have caking force or property. Then, the molding must be effected by either sintering the material under an extremely high temperature or using a binder in combination. For this reason, the sintering under the very high temperature may cause melting of the surface layer of the crystal or the use of binder may cause blocking of the porous structure. Hence, in either case, there results decrease in the ratio of the crystalline microporous structure present in the molded material, i.e. the molded material will suffer decrease in the ratio of the porous structure per unit weight. Consequently, the resultant molded material tends to suffer deterioration in such properties as adsorbent activity, catalyst activity afforded by the porous structure.

Taking the above-described state of the art into consideration, a primary object of the present invention is to provide an improved method which allows inexpensive synthesis of crystalline microporous material under milder reaction conditions. A further object is to provide an inexpensive crystalline microporous material or crystalline microporous molded product obtained by the method. A still further object of the invention is to provide a crystalline microporous material which may achieve superior performance in a variety of applications.

SUMMARY OF THE INVENTION

For fulfilling the above object, a method of manufacturing crystalline microporous material, according to the characterizing features of the present invention, comprises the steps of:

a mixing step for obtaining alkaline mixture liquid including: at least one kind of crystallization modifier selected from the group consisting of ammonium ion ($R_4N^+$: R is at least one selected from the group consisting of hydrogen, and alkyl group or aryl group having carbon number of 10 or less), phosphonium ion ($R_4P^+$: R is at least one selected from the group consisting of hydrogen and alkyl group or aryl group having carbon number of 10 or less) and amine; and canemite(ideal composition formula: $NaHSi_2O_5$) fine particles;

a solid-liquid separating step, subsequent to the mixing step, for separating solid component of fine particles deposited in the mixture liquid from this inorganic material mixture liquid; and a crystallizing step for crystallizing, by heating, the solid component separated through the solid-liquid separation (this method will be referred to as 'manufacturing method A', hereinafter).

In the present invention, said crystallization modifier preferably comprises at least one selected from the group consisting of:

tetra-n-butylammonium ion ($(n-C_4H_9)_4N^+$),
tetra-n-propylammonium ion ($(n-C_3H_7)_4N^+$),
tetra-ethylammonium ion ($(C_2H_5)_4N^+$), tetra-methylammonium ion $((CH_3)_4N^+)$,
n-propyltrimethylammonium ion $((n-C_3H_7)(CH_3)_3N^+)$,
benzyltrimethylammonium ion $((C_7H_7)(CH_3)_3N^+)$,
tetra-n-butylphosphonium ion $((n-C_4H_9)_4P^+)$,
1,4-dimethyl-1,4-diazabicyclo[2,2,2]octane,
pyrrolidine,
n-propylamine$(n-C_3H_7NH_2)$, and
methylquinuclidine.

Further, the solid-liquid separating step may be effected after a neutralizing step for neutralizing the mixture liquid.

An alternative method of manufacturing crystalline microporous material, according to the further characterizing features of the present invention, comprises the steps of:

a mixing step for obtaining alkaline inorganic material mixture liquid including: at least one kind of crystallization modifier selected from the group consisting of ammonium ion ($R_4N^+$: R is at least one selected from the group consisting of hydrogen, and alkyl group or aryl group having carbon number of 10 or less), phosphonium ion ($R_4P^+$: R is at least one selected from the group consisting of hydrogen and alkyl group or aryl group having carbon number of 10 or less) and amine; and silicon dioxide ($SiO_2$);

a solid-liquid separating step, subsequent to the mixing step, for separating solid component of fine particles deposited in the mixture liquid from this inorganic material mixture liquid; and a crystallizing step for crystallizing, by heating, the solid component separated through the solid-liquid separation (this method will be referred to as 'manufacturing method B', hereinafter).

The crystallization modifier used in the above may be the crystallization modifier described as being preferred in the manufacturing method A.

Further, in this method too, the solid-liquid separating step may be effected after a neutralizing step for neutralizing the mixture liquid.

Moreover, as a still further manufacturing method preferred in the invention, there is proposed a method comprising the steps of:

a mixing step for obtaining alkaline inorganic material mixture liquid including silicon dioxide ($SiO_2$) component and aluminum salt; a solid-liquid separating step, subsequent to the mixing step, for separating solid component of fine particles deposited in the mixture liquid from this inorganic material mixture liquid; and a crystallizing step for crystallizing, by heating, the solid component separated through the solid-liquid separation (this method will be referred to as 'manufacturing method C', hereinafter).

In any one of the above manufacturing methods A, B and C, the crystallization step may comprise a step of heating a sealed container into which the solid-liquid separated solid component has been introduced, or a step of supplying water vapor to the solid-liquid separated solid component. Further, the crystallization step may be provided after the solid-liquid separated solid component is molded.

Functions and effects of the invention will be described next.

In the case of the manufacturing methods A, B, when the canemite component or silicon dioxide component is caused to coexist with the crystallization modifier under the alkaline condition (mixing step), the inorganic material aggregates around the crystallization modifier to form fine particles of composite material. Thus, these fine particles of composite material may be collected separately as solid component. The present invention has been achieved based on a new finding that the separated composite solid component undergoes a phase change by the heating to be rendered into porous crystalline material.

More particularly, by heating the solid component to crystallize it (crystallizing step), the composite material is crystallized in such a form that the inorganic material surrounds the crystallization modifier as a core. Consequently, from this crystal, simply by heating the composite material in the form of solid, there may be obtained a porous structure having a uniform pore diameter.

Further, the crystallization modifier may be at least one selected from the group consisting of;

ammonium ion ($R_4N^+$: R is at least one selected from the group consisting of hydrogen, and alkyl group or aryl group having carbon number of 10 or less), phosphonium ion ($R_4P^+$: R is at least one selected from the group consisting of hydrogen and alkyl group or aryl group having carbon number of 10 or less), and amine. In particular, the modifier preferably comprises at least one selected from the group consisting of:

tetra-n-butylammonium ion $((n-C_4H_9)_4N^+)$,
tetra-n-propylammonium ion $((n-C_3H_7)_4N^+)$,
tetra-ethylammonium ion $((C_2H_5)_4N^+)$,
tetra-methylammonium ion $((CH_3)_4N^+)$,
n-propyltrimethylammonium ion $((n-C_3H_7)(CH_3)_3N^+)$,
benzyltrimethylammonium ion $((C_7H_7)(CH_3)_3N^+)$,
tetra-n-butylphosphonium ion $((n-C_4H_9)_4P^+)$,
1,4-dimethyl-1,4-diazabicyclo(2,2,2)octane,
pyrrolidine,
n-propylamine$(n-C_3H_7NH_2)$, and
methylquinuclidine.

But, other kinds of ammonium salt, phosphonium salts, amines may be also used.

Incidentally, if tetra-n-propylammonium salt is employed, there is obtained crystalline microporous material having MFI structure. And, if tetra-n-butylammonium is employed, there is obtained crystalline microporous material having MEL structure. Accordingly, by selecting the organic ammonium salt depending on the structure to be synthesized, it is possible to obtain crystalline microporous material having a desired pore diameter.

Further, in the case of the manufacturing method A or B, if the solid-liquid separating step is provided after the neutralizing step for neutralizing the inorganic material mixture liquid, the composite material tends to be formed into fine particles and the composite solid component tends to have caking property. Therefore, the material may be readily molded in advance by such simple operation as a pressurizing operation. Therefore, in this case, if the crystallizing step is effected after the composite material is molded, there is obtained an advantage that a molded product, even if having a complex shape, may be readily obtained.

In the case of the manufacturing method C, the mixture liquid containing the silicon dioxide component is caused to contain aluminum salt to be rendered alkaline (mixing step), composite material including aluminum tends to be formed in the inorganic material mixture liquid containing the aluminum salt. Then, it has been found out that for this composite material also, if the solid-liquid separating step for separating between solid component and liquid component in the inorganic material mixture liquid and the crystallizing step for crystallization under heating are provided, the porous material undergoes a phase change in its structure to be crystallized into porous crystal. Accordingly, with this method too, like the manufacturing methods A, B, crystalline microporous material may be obtained. Therefore, by the simple operation of just heating the solid material, crystalline microporous material may be obtained.

Further, since the solid component of the composite material of the invention tends to have caking property, the material may be readily molded in advance by such simple operation as a pressurizing operation. Therefore, if the crystallizing step is effected after the composite material is molded, there is obtained an advantage that a molded product, even if having a complex shape, may be readily obtained.

Further, the crystallization step may comprise a step of heating a sealed container into which the the solid-liquid separated solid component has been introduced, or a step of supplying water vapor to the solid-liquid separated solid component. Further, the crystallization step may be provided after the solid-liquid separated solid component is molded. With these heating methods, there is no necessity of heating to a high temperature under a high pressure condition. And, if necessary, the heating may be effected by using water vapor under a normal pressure. Consequently, the handling of the material may be facilitated and the manufacturing costs may be reduced as well.

As described above, according to the present invention, the crystallization of the microporous material may be effected by the simple operation of heating solid component. There is no necessity of the hydrothermal synthesis method using a high-pressure heating container. As the material may be handled in the form of solid, the handling is easier than that in the hydrothermal synthesis method in which the material is handled in the form of mixture liquid. Moreover, there is no necessity of providing the heating container with such measure as the anti-alkaline corrosion treatment, so that the manufacturing costs may be reduced in terms of the installation costs also. And, a more simple safety measure may suffice for the purpose. Furthermore, since the heating crystallizing conditions may be milder than those required by the convention (for instance, in embodiments to be described later, conditions of 180° C. for 8 hours may be sufficient), so that the manufacturing costs may be reduced in terms of the reaction condition needed for the manufacture. With the above-described effects combined, the methods according to the present invention achieve significant improvement over the conventional method with respect to the economy and safety. Further, in the case of e.g. a small-scale research and development activity, the synthesis is possible by using such a simple device as an ordinary glass container. Therefore, these methods will prove useful in e.g. development/manufacture of crystalline microporous material in small amounts and in a great variety.

The method of the present invention may be considered as a synthesis method based on phase change occurring in the structure of inorganic compound regulated by salvation cluster of organic ammonium ion. Accordingly, when the performances required of crystalline microporous material are being more and more distinguished and differentiated from one another in a variety of industries, the method of the invention will prove to be greatly useful in structural designing with higher molecular level precision.

Further, according to the present invention, there may be obtained crystalline microporous material having strong caking force, which may be readily pre-molded into a molded product having a complicated shape. Therefore, in comparison with the molded product made of the conventional crystalline microporous material obtained by pre-molding the raw material using a binder and then sintering this pre-molded material, the molded product obtained by the method of the present invention may achieve superior performance attributable to the porous structure, such as increase in the ratio of the porous structure per unit weight. As a result, this material may prove to find new applications in those technical fields that used to deny the use of the conventionally molded products because of their poor performance.

Moreover, if the solid component of the composite material alone is molded and then crystallized, the resultant molded product will have improved dimension stability over a molded product obtained by high-temperature sintering operation. So that, the yield of the molded product will be improved and the manufacturing costs may be reduced in this respect as well.

The solid component of the composite material obtained by the method of the invention may be used as a binder. Then, if crystalline microporous material such as natural zeolite or material manufactured by a method different form the method of the invention is molded with using the solid component obtained by the method of the present invention as a binder, the resultant molded product will be formed entirely of the crystalline microporous material.

Further, by exposing the crystalline microporous material to aluminum chloride vapor or by introducing aluminum ion into the material, aluminum element may be introduced into the crystal structure. And, the crystalline microporous material provided with such treatment as above may be used as catalyst for use in the manufacture of ethylbenzene or praraxylene.

BEST MODES FOR EMBODYING THE INVENTION

Next, embodiments of the invention will be described. Yet, the present invention is not limited to these embodiments.

Incidentally, as raw materials, those having the following compositions were employed (all % notations are wt. %)

water glass No. 3: analyzed values: $SiO_2$: 29.17%, $Na_2O$: 9.82% (T silicate soda No. 3, manufactured by Nippon Chemical Industries Co., Ltd.);

silica powder (high purity silica powder manufactured by Tama Chemical Industries Co., Ltd.);

tetra-n-propylammonium bromide(($n-C_3H_7)_4NBr$): (manufactured by Tokyo Kasei Industries Co., Ltd.);

tetra-n-butylammonium bromide(($n-C_4H_9)_4NBr$) (manufactured by Tokyo Kasei Industries Co., Ltd.);

aluminum chloride($AlCl_3$ $6H_2O$): (manufactured by Kishida Chemical Co., Ltd.)

benzyltrimethylammonium chloride(($C_7H_7)(CH_3)_3NCl$): (manufactured by Tokyo Kasei Industries Co., Ltd.):

tetra-n-propylammonium hydroxide(($n-C_3H_9)_4NOH$) water solution: 20–25% (manufactured by Tokyo Kasei Industries Co., Ltd.)

benzyltrimethylammonium hydroxide(($C_7H_7)(CH_3)_3NOH$) water solution: 40% (manufactured by Tokyo Kasei Industries Co., Ltd.)

aluminum-tri-sec-butoxide($Al(O-(CH(CH_3)(C_2H_5))_3$) (manufactured by Tokyo Kasei Industries Co., Ltd.)

sodium alminate ($NaAlO_2$): (manufactured by Wako Junyaku Co., Ltd.)

tetraethylorthosilicate ("TEOS", manufactured by Tokyo Kasei Industries Co., Ltd.)

tetra-n-butylammonium hydroxide(($n-C_4H_9)_4NOH$) aqueous solution: 40% ("TBAOH", manufactured by Tokyo Kasei Industries Co., Ltd.)

copper acetylacetate (Cu(CH$_3$COCHCOCH$_3$)$_2$): (manufactured by Dozin Chemical Research Institute)

EXAMPLES 1

200 g of water glass No. 3 was prepared in a 500 ml beaker and 14 g of sodium hydroxide was dissolved therein. Thereafter, the mixture was placed onto an evaporation plate made of alumina. This plate was introduced into a thermostatic oven maintained at 150° C. to evaporate the water content of the mixture. The resultant product obtained after the water content evaporation, together with the evaporation plate, was introduced into an electric furnace to be sintered therein at 700° C. for about 7 hours. Then, the sintered product was allowed to be cooled to room temperature, whereby a reaction product was obtained. This reaction product was submerged in 700 ml water in a beaker, whereby fine particle precipitation was obtained. The fine particle precipitation was collected by means of filtration under reduced pressure, rinsed with deionized water, and then naturally dried at room temperature, whereby about 60 g of canemite (ideal composition formula: NaHSi$_2$O$_5$ 3H$_2$O) was obtained.

Tetra-n-propylammonium bromide 5.32 g was added with deionized water to obtain 200 g of solution. Into this solution, 10 g of the above-described canemite was dispersed and heated up to 70° C. and left still for 3 hours (mixing step). Then, after naturally cooling the solution to room temperature, 2M (mol/l) of hydrochloric acid was added thereto to gradually lower the pH value of the mixture solution to 8 approximately, whereby there occurred sudden bulging in the volume of canemite (neutralizing step). This phenomenon is believed to be attributable to an ion exchange reaction between sodium ion in canemite and tetra-n-propylammonium ion ((n-C$_3$H$_7$)$_4$N$^+$). Then, this bulged canemite was collected by means of filtration under reduced pressure, rinsed with deionized water, and then naturally dried at room temperature, whereby white powderly material was obtained (solid-liquid separating step). This white powderly material is believed to be composite material of canemite and tetra-n-propylammonium ion.

About 1 g of the above-described composite material was placed on a small glass filter and this glass filter, together with about 7 g of deionized water, was placed into a pressure-resistant container having an inner surface thereof coated with fluorine resin. Then, a heating operation was effected for eight hours by using steam at 130° C. without directly exposing the composite material to the water, whereby reaction product was obtained (crystallizing step). A powder X-ray diffraction spectrum analysis effected on this reaction product revealed that the product was crystalline microporous material comprised of silicalite-1 having the MFI structure.

EXAMPLES 2

6.44 g of tetra-n-butylammonium bromide was added with deionized water to prepare 200 g of solution. And, 10 g of canemite manufactured in the Example 1 was dispersed in the solution and heated to 70° C. and then allowed to cool to room temperature. Thereafter, 2 mol/l of hydrochloric acid was added thereto to gradually lower the pH value to 8 approximately (composite material forming step and neutralizing step). In this case too, like the Example 1, sudden bulging in the volume of canemite was observed. Then, this bulged canemite was collected by means of filtration under reduced pressure, rinsed with deionized water, and then naturally dried at room temperature, whereby white powderly material was obtained (solid-liquid separating step). This white powderly material is believed to be composite material of canemite and tetra-n-butylammonium ion ((n-C$_4$H$_9$)$_4$N$^+$).

Like the Example 1, on this composite material, a heating operation was effected by exposing the material to steam at 130° C. for 24 hours, whereby reaction product was obtained (crystallizing step). A powder X-ray diffraction spectrum analysis effected on this reaction product revealed that the product was crystalline microporous material comprised of silicalite-2 having the MEL structure.

EXAMPLE 3

The powderly composite material manufactured by the same method as the Example 1 was placed into a test tube made of hard glass and this test tube was sealed in the air by melting. Then, the test tube was heated for 20 hours in a thermostatic oven maintained at 130° C. and then allowed to cool to room temperature, whereby reaction product was obtained (crystallizing step). The reaction product was taken out of the test tube, and a powder X-ray diffraction spectrum analysis of this reaction product revealed that the product was crystalline microporous material comprised of silicalite-1 like that of the Example 1.

EXAMPLE 4

The powderly composite material manufactured by the same method as the Example 1 was subjected to a uniaxial compression at 500 MPa by using a hydraulic press, whereby molded product was obtained. Then, this molded product was placed into a test tube made of hard glass and the test tube was sealed in the air by melting. Then, this test tube was heated for 20 hours in a thermostatic oven maintained at 130° C. (crystallizing step). Incidentally, after the cooling to room temperature, the reaction product was taken out of the test tube and the product was checked whether it exhibited any deformation or not. But, no deformation was found. The reaction product was taken out of the tube and a powder X-ray diffraction spectrum analysis effected on this reaction product revealed that the product was crystalline microporous material comprised of silicalite-1 like that of the Example 1.

EXAMPLE 5

The powderly composite material manufactured by the same method as the Example 1 was exposed to steam at 130° C. under the normal pressure for 20 hours, whereby reaction product was obtained (crystallizing step). A powder X-ray diffraction spectrum analysis effected on this reaction product revealed that the product was crystalline microporous material comprised of silicalite-1 like that of the Example 1.

EXAMPLE 6

Tetrapropylammonium bromide 5.32 g was added with deionized water to obtain 200 g of solution. Into this solution, 10 g of the canemite manufactured in the Example 1 was dispersed and heated up to 70° C. and left still for 3 hours (mixing step). Then, this mixture solution was added with 20 g solution prepared by adding deionized water to 0.97 g of aluminum chloride and added further with hydrochloric acid so as to adjust its pH value to 8 (neutralizing step). In the above, 3.64 g of 2N hydrochloric acid was necessary.

The neutralized mixture solution was filtered under reduced pressure and rinsed with deionized water.

Thereafter, the solution was dried naturally at room temperature, whereby powderly material was obtained (solid-liquid separating step). This powderly material is believed to be composite material of canemite and tetra-n-propylammonium ion.

The above-described powderly material was placed into a test tube made of hard glass and this test tube was sealed in the air by melting. Then, the test tube was heated for 53 hours in a thermostatic oven maintained at 130° C., whereby reaction product was obtained (crystallizing step). A powder X-ray diffraction spectrum analysis and analysis using Al-NMR were effected on this reaction product. Then, 4 coordinated aluminum was confirmed and the product was found to be crystalline microporous material comprised of ZSM-5.

EXAMPLE 7

Benzyltrimethylammonium chloride 1.81 g was added with deionized water to obtain 40 g of solution. Into this solution, 10 g of the canemite manufactured in the Example 1 was dispersed and heated up to 70° C. and left still for 3 hours (mixing step). Then, this mixture solution was added with 30 g solution prepared by adding deionized water to 2.45 g of aluminum chloride. This solution had pH value of about 9. This mixture liquid was filtered under reduced pressure and collected. Thereafter, the solution was naturally dried at room temperature, whereby powderly material was obtained (solid-liquid separating step). A fluorescence X-ray spectrum analysis effected on this powderly material showed that the material had Si/Al element ratio of 97:7. This material is believed to be composite material of canemite, aluminum ion and benzyltrimethylammonium ion ($C_7H_7$) $(CH_3)_3N^+$).

The above-described powderly material was placed into a test tube made of hard glass and this test tube was sealed in the air by melting. Then, this test tube was heated for 600 hours in a thermostatic oven maintained at 150° C., whereby reaction product was obtained (crystallizing step). A powder X-ray diffraction spectrum analysis effected on this reaction product revealed that the product comprised crystalline microporous material comprised of mordenite having MOR structure.

Comparative Example 1

About 1 g of canemite manufactured in the Example 1 was directly placed onto a small glass filter, and this glass filter, together with about 7 g of deionized water, was introduced into a pressure-resistant container having an inner surface thereof coated with fluorine resin and heated by exposing it to water vapor at 130° C. for 8 hours without exposing canemite directly to the water. However, canemite deliquesced due to the steam and nothing was left on the glass filter. No crystallization was made. Incidentally, the solution remaining in the pressure-resistant container showed a strong alkaline property exceeding pH 10.

EXAMPLE 8

100 g of water glass No. 3 was added with 100 g of deionized water to be diluted thereby, to which 13 g of tetra-propylammonium bromide was added and the mixture solution was stirred well, whereby inorganic material mixture liquid in the form of soft gel was obtained (mixing step). With addition thereto of about 18 g of strong hydrochloric acid, the soft gel was rendered into harder gel. Supernatant liquid of this gel was found to have a pH value of 8 approximately. After this hard gel was rinsed sufficiently with deionized water, the gel was collected by means of filtration under reduced pressure and then dried naturally at room temperature, whereby white powderly material was obtained (solid-liquid separating step). This powderly material is believed to comprise composite material of water glass and tetra-n-propylammonium ion.

The above-described powderly material was placed into a test tube made of hard glass and this test tube was sealed in the air by melting. Then, the test tube was heated for 24 hours in a thermostatic oven maintained at 150° C., whereby reaction product was obtained (crystallizing step).

A powder X-ray diffraction spectrum analysis effected on this reaction product revealed that the product comprised crystalline microporous material comprised of silicalite-1 having the MFI structure.

EXAMPLE 9

100 g of water glass No. 3 was added with 100 g of deionized water to be diluted thereby, to which 13 g of tetra-n-propylammonium bromide and 2.3 g of aluminum chloride were added and the mixture solution was stirred well, whereby inorganic material mixture liquid in the form of soft gel was obtained (mixing step). With addition thereto of about 16 g of conc. hydrochloric acid, the soft gel was rendered into harder gel. Supernatant liquid of this gel was found to have a pH value of 8 approximately. After this hard gel was rinsed sufficiently with deionized water, the gel was collected by means of filtration under reduced pressure and then dried naturally at room temperature, whereby white powderly material was obtained (solid-liquid separating step). This powderly material is believed to comprise composite material of water glass, tetra-n-propylammonium ion and aluminum chloride.

The above-described powderly material was placed into a test tube made of hard glass and this test tube was sealed in the air by melting. Then, the test tube was heated for 24 hours in a thermostatic oven maintained at 150° C. and then allowed to cool to room temperature, whereby reaction product was obtained (crystallizing step).

A powder X-ray diffraction spectrum analysis effected on this reaction product revealed that the product comprised crystalline microporous material comprised of ZSM-5 having the MFI structure.

EXAMPLE 10

100 g of water glass No. 3 was added with 100 g of deionized water to be diluted thereby, to which 16 g of tetra-n-butylammonium bromide was added and the mixture solution was stirred well, whereby inorganic material mixture liquid in the form of soft gel was obtained (mixing step). With addition thereto of about 12 g of conc. hydrochloric acid, the soft gel was rendered into harder gel. Supernatant liquid of this gel was found to have a pH value of 8 approximately. After this hard gel was rinsed sufficiently with deionized water, the gel was collected by means of filtration under reduced pressure and then dried naturally at room temperature, whereby white powderly material was obtained (solid-liquid separating step). This powderly material is believed to comprise composite material of water glass and tetra-n-butylammonium ion (($n-C_4H_9)_4N^+$).

The above-described powderly material was placed into a test tube made of hard glass and this test tube was sealed in the air by melting. Then, this test tube was heated for 40 hours in a thermostatic oven maintained at 130° C. and then allowed to cool to room temperature, whereby reaction product was obtained out of the test tube (crystallizing step).

A powder X-ray diffraction spectrum analysis effected on this reaction product revealed that the product comprised crystalline microporous material comprised of silicalite-2 having the MEL structure.

EXAMPLE 11

About 1 g of the powderly composite material manufactured in the Example 1 was placed onto a small glass filter, and this glass filter, together with about 7 g of deionized water, was introduced into a pressure-resistant container having an inner surface thereof coated with fluorine resin and heated by exposing it to water vapor at 130° C. for 8 hours without exposing canemite directly to the water (crystallizing step).

A powder X-ray diffraction spectrum analysis effected on this reaction product revealed that the product comprised crystalline microporous material comprised of silicalite-1 having the MFI structure.

EXAMPLE 12

The Powderly composite material manufactured in the Example 1 was subjected to a uniaxial compression at 500 MPa by using a hydraulic press, whereby molded product was obtained. Then, this molded product was placed into a test tube made of hard glass and the test tube was sealed in the air by melting. Then, this test tube was heated for 20 hours in a thermostatic oven maintained at 130° C. and then allowed to cool to room temperature, whereby reaction product was obtained (crystallizing step). Incidentally, the reaction product was taken out of the test tube and the product was checked whether it exhibited any deformation or not. No deformation was found.

A powder X-ray diffraction spectrum analysis effected of this reaction product revealed that the product was crystalline microporous material comprised of silicalite-1 having the MFI structure like that of the Example 1.

EXAMPLE 13

About 1 g of the powderly composite material manufactured in the Example 1 was placed onto a small glass filter, and this was heated by exposing it to steam at 130° C. for 20 hours, whereby reaction product was obtained (crystallizing step).

A powder X-ray diffraction spectrum analysis effected on this reaction product revealed that the product comprised crystalline microporous material comprised of silicalite-1 having the MFI structure like that of the Example 1.

EXAMPLE 14

60 g of silica powder was left still for two weeks at room temperature in 90 g of water solution containing tetra-n-propylammonium hydroxide, so that the silica powder could be dispersed uniformly in the solution, whereby inorganic material mixture solution was obtained (mixing step). When this inorganic material mixture solution was added with a large amount of methanol, white precipitation product was formed therein. This white precipitation product was collected by filtration under reduced pressure and naturally dried at room temperature, whereby white powderly material was obtained (solid-liquid separating step). This powderly material is believed to comprise composite material of silica and tetra-n-propylammonium ion.

The above-described powderly material was placed into a test tube made of hard glass and this test tube was sealed in the air by melting. Then, this test tube was heated for 20 hours in a thermostatic oven maintained at 150° C. and then allowed to cool to room temperature, whereby reaction product was obtained out of the test tube (crystallizing step).

A powder X-ray diffraction spectrum analysis effected on this reaction product revealed that the product comprised crystalline microporous material comprised of silicalite-1 having the MFI structure.

EXAMPLE 15

Solution prepared by diluting 100 g of water glass No. 3 with 100 g of deionized water and further solution prepared by dissolving 40 g of sodium alminate in 60 g of deionized water were mixed and stirred well, whereby inorganic material mixture liquid in the form of gel was obtained (mixing step). Incidentally, supernatant liquid of this inorganic material mixture liquid was found to have a pH value of about 10. This hard gel was sufficiently rinsed with deionized water and collected by filtration under reduced pressure and then dried naturally, whereby white powderly material was obtained (solid-liquid separating step). This powderly material is believed to comprise composite material of water glass and aluminum oxide. A fluorescence X-ray spectrum analysis effected on this powderly material showed that the material had $SiO_2/Al_2O_3$ mol ratio of 5.3.

The above-described powderly material was placed into a test tube made of hard glass and this test tube was sealed in the air by melting. Then, this test tube was heated for 24 hours in a thermostatic oven maintained at 130° C. and allowed to be cooled to room temperature, whereby reaction product was obtained (crystallizing step).

A powder X-ray diffraction spectrum analysis effected on this reaction product revealed that the product comprised crystalline microporous material comprised of Na-P1 having GIS structure.

EXAMPLE 16

The powderly composite material manufactured in the Example 15 was placed into a test tube made of hard glass and sealed in the air by melting. This was then heated by being kept in a thermostatic oven maintained at 150° C. for 45 hours and then allowed to be cooled to room temperature, whereby reaction product was obtained (crystallizing step).

A powder X-ray diffraction spectrum analysis effected on this reaction product revealed that the product comprised crystalline microporous material comprised of analcime having ANA structure.

EXAMPLE 17

62.5 g of tetraethylorthosilicate, 19.5 g of water solution of tetrabutylammonium hydroxide and 68.3 g of deionized water were mixed together and heated for one hour at 80° C., whereby inorganic material mixture liquid in the form of gel was obtained (mixing step). (This phenomenon is believed to be attributable to that tetraethylorthosilicate was hydrolyzed and condensated in association with elimination of ethanol therefrom.)

The inorganic material mixture liquid was filtered under reduced pressure to obtain solid component. And, this solid component was rinsed well with acetone and naturally dried, whereby powderly material was obtained (solid-separating step). This powderly material is believed to comprise composite material of amorphous silicon dioxide and tetra-n-butylammonium ion.

The powderly composite material was placed into a test tube made of hard glass and this test tube was sealed in the air by melting. Then, this test tube was heated for 71 hours in a thermostatic oven maintained at 150° C. and allowed to be cooled to room temperature, whereby reaction product was obtained (crystallizing step).

A powder X-ray diffraction spectrum analysis effected on this reaction product revealed that the product comprised crystalline microporous material comprised of silicalite-2 having MEL structure.

EXAMPLE 18

83.3 g of tetraethylorthoxylate, 36.2 g of water solution of tetrapropylammonium hydroxide and 1 g of copper acetylacetate were mixed together and heated for one hour at 80° C., whereby inorganic material mixture liquid in the form of gel was obtained (mixing step). The inorganic material mixture liquid was filtered under reduced pressure to obtain solid component. And, this solid component was rinsed well with acetone and naturally dried, whereby green-colored powderly material was obtained (solid-separating step). This powderly material is believed to comprise composite material of amorphous silicon dioxide and tetra-n-propylammonium ion.

The powderly composite material was placed into a test tube made of hard glass and this test tube was sealed in the air by melting. Then, the test tube was heated for 24 hours in a thermostatic oven maintained at 150° C. and allowed to be cooled to room temperature, whereby reaction product was obtained (crystallizing step).

A powder X-ray diffraction spectrum analysis effected on this reaction product revealed that the product comprised crystalline microporous material comprised of silicalite-1 having MFI structure. It is believed that this crystalline microporous material includes copper acetylacetate and can be used as a catalyst for e.g. denitration reaction.

EXAMPLE 19

83.3 g of tetraethylorthosilicate, 16.7 g of water solution of benzyltrimethylammonium hydroxide, 4.9 g of aluminum-tri-sec-butoxide(Al(O—(CH(CH$_3$)(C$_2$H$_5$))$_3$), and 20 g of ethanol were mixed together and heated for one hour at 80° C., whereby inorganic material mixture liquid in the form of gel was obtained (mixing step). The inorganic material mixture liquid was filtered under reduced pressure and rinsed well and then dried naturally, whereby white powderly material was obtained (solid-separating step).

A fluorescence X-ray spectrum analysis effected on this powderly material showed that the material had Si/Al element ratio of 95:5. Therefore, this material is believed to be composite material of amorphous silicon dioxide, aluminum oxide and benzyltrimethylammonium ion ((C$_7$H$_7$)(CH$_3$)$_3$N$^+$).

The powderly composite material was placed into a test tube made of hard glass and this test tube was sealed in the air by melting. Then, the test tube was heated for 530 hours in a thermostatic oven maintained at 150° C. and allowed to be cooled to room temperature, whereby a reaction product was obtained (crystallizing step).

A powder X-ray diffraction spectrum analysis effected on this reaction product revealed that the product comprised crystalline microporous material comprised of mordenite having MOR structure.

Industrial Applicability

The crystalline microporous material obtained by the present invention may be used as material for adhesive agent, catalyst or separating material, more particularly, flon type cooling medium, drying agent for sulfur fluoride which is insulating medium for high-voltage electric appliances or for pneumatic brake of vehicles, or adsorbing/eliminating agent for adsorbing/eliminating nitrogenous substances from waste water or radioactive substances from radioactive waste water, or further as catalyst carrier for carrying various metal catalysts in the field of mainly e.g. petrochemical industries.

We claim:

1. A method of manufacturing a crystalline microporous material comprising the steps of:

mixing an alkaline liquid, kanemite and at least one crystallization modifier selected from the group consisting of an ammonium ion of the formula R$_4$N$^+$, a phosphonium ion of the formula R$_4$P$^+$ and amine, wherein R is at least one selected from the group selected from the group consisting of hydrogen, C$_1$–C$_{10}$ alkyls, and C$_1$–C$_{10}$ aryls, to form an alkaline liquid mixture containing particles, said particles comprising kanemite and crystallization modifier;

separating the particles from the alkaline liquid; and crystallizing the particles by heating to form the crystalline microporous material.

2. The method of claim 1, wherein said crystallization modifier comprises at least one ion selected from the group consisting of tetra-n-butylammonium ion, tetra-n-propylammonium ion, tetra-ethylammonium ion, tetra-methylammonium ion, n-propyltrimethylammonium ion, benzyltrimethylammonium ion, tetra-n-butylphosphonium ion, 1,4-dimethyl-1,4-diazabicyclo(2,2,2)octane, pyrrolidine, n-propylamine and methylquinuclidine.

3. The method of claim 1, wherein the separating step is effected after a neutralizing step for neutralizing the alkaline liquid mixture.

4. The method of claim 1, wherein said crystallization step comprises a step of heating a sealed container into which the particles have been introduced.

5. The method of claim 1, wherein said crystallization step comprises the step of heating the particles by water vapor.

6. The method of claim 1, wherein the mixing step includes an ion-exchange reaction.

7. The method of claim 1, wherein said crystallization step is provided after the particles are molded.

8. A method of manufacturing crystalline microporous material, comprising:

mixing an alkaline liquid, silicon dioxide and at least one crystallization modifier selected from the group consisting of an ammonium ion of the formula R$_4$N$^+$, a phosphonium ion of the formula R$_4$P$^+$ and amine, wherein R is at least one selected from the group selected from the group consisting of hydrogen, C$_1$–C$_{10}$ alkyls, and C$_1$–C$_{10}$ aryls, under conditions sufficient to form a gel;

separating excess liquid from the gel to form particles comprising silicon dioxide and crystallization modifier; and crystallizing the particles in the absence of added liquid water to form said crystalline microporous material.

9. The method of claim 8, wherein said crystallization modifier comprises at least one ion selected from the group consisting of tetra-n-butylammonium ion, tetra-n-propylammonium ion, tetra-ethylammonium ion, tetra-methylammonium ion, n-propyltrimethylammonium ion, benzyltrimethylammonium ion, tetra-n-butylphosphonium ion, 1,4-dimethyl-1,4-diazabicyclo(2,2,2)octane, pyrrolidine, n-propylamine and methylquinuclidine.

10. The method of claim 8, wherein the separating step is effected after a neutralizing step for neutralizing said gel.

11. The method of claim 8, wherein said crystallization step comprises a step of heating a sealed container into which the particles have been introduced.

12. The method of claim 8, wherein said mixing step includes a hydrolysis reaction of an organic silicon compound.

13. A method of manufacturing crystalline microporous material, which comprises the steps of:

mixing an alkaline liquid silicon dioxide and an aluminum salt under conditions sufficient to form a gel;

separating excess liquid from the gel to obtain particles; and crystallizing the particles in the absence of added liquid water to form said crystalline microporous material.

14. The method of claim 13, wherein said crystallization step comprises a step of heating a sealed container into which the particles have been introduced.

15. The method of claim 13, wherein said mixing step includes a hydrolysis reaction of an organic silicon compound.

16. A method of manufacturing crystalline microporous material, comprising:

mixing an alkaline liquid, silicon dioxide and at least one crystallization modifier selected from the group consisting of an ammonium ion of the formula $R_4N^+$, a phosphonium ion of the formula $R_4P^+$ and amine, wherein R is at least one selected from the group selected from the group consisting of hydrogen, $C_1$–$C_{10}$ alkyls, and $C_1$–$C_{10}$ aryls, under conditions sufficient to form a gel, separating excess liquid from the gel to form particles comprising silicon dioxide and crystallization modifier; and crystallizing the particles by heating to form said microporous material, wherein said crystallization step comprises the step of heating the particles with water vapor.

17. A method of manufacturing crystalline microporous material, which comprises the steps of:

mixing an alkaline liquid, silicon dioxide and an aluminum salt under conditions sufficient to form a gel;

separating excess liquid from the gel to obtain particles; and crystallizing the particles to form said crystalline microporous material, wherein said crystallization step comprises the step of heating the particles with water vapor.

18. A method of manufacturing crystalline microporous material, comprising:

mixing an alkaline liquid, silicon dioxide and at least one crystallization modifier selected from the group consisting of an ammonium ion of the formula $R_4N^+$, a phosphonium ion of the formula $R_4P^+$ and amine, wherein R is at least one selected from the group selected from the group consisting of hydrogen, $C_1$–$C_{10}$ alkyls, and $C_1$–$C_{10}$ aryls, under conditions sufficient to form a gel;

separating excess liquid from the gel to form particles comprising silicon dioxide and crystallization modifier;

molding the particles; and crystallizing the molded particles to form said crystalline microporous material.

* * * * *

UNITED STATES PATENT AND TRADEMARK OFFICE
CERTIFICATE OF CORRECTION

PATENT NO. : 6,022,519
DATED : February 8, 2000
INVENTOR(S) : Shimizu et al

Page 1 of 2

It is certified that error appears in the above-identified patent and that said Letters Patent is hereby corrected as shown below:

Column 4,
Line 29, insert spaces in the word "diazabicyclo(2,2,2)octane"
to read as -- diazabicylo (.2,2,2) octane -- .

Column 5
Line 53, change "salvation" to read as -- solvation -- .

Column 6
Line 46, insert a space between the word " bromide" and the following parenthesis
to read as -- bromide ( -- .
Line 48, insert a space between the word " chloride"and the following parenthesis
to read as -- chloride ( -- .
Line 48, insert a space between the word "hydroxide" and the following parenthesis
to read as -- hydroxide ( -- .
Line 50, insert a space between the word "chloride" and the following parehthesis
to read -- chloride ( -- .
Line 52, insert a space between the word "hydroxide" and the following parenthesis
to read -- hydroxide ( -- .
Line 59, insert a space between the word "butoxide" and the following parenthesis
to read as -- butoxide ( -- .

Column 9
Line 33, insert an additional parenthesis in "($C_7H_7$" to read as -- (($C_7H_7$ -- .

UNITED STATES PATENT AND TRADEMARK OFFICE
CERTIFICATE OF CORRECTION

PATENT NO. : 6,022,519
DATED : February 8, 2000
INVENTOR(S) : Shimizu et al

It is certified that error appears in the above-identified patent and that said Letters Patent is hereby corrected as shown below:

Column 13,
Line 41, insert a space between the word "butoxide" and the following parenthesis to read as -- butoxide ( -- .

Column 15,
Line 33, change "," to read as -- ;-- .

Signed and Sealed this

Twenty-first Day of August, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,022,519  
DATED        : February 8, 2000  
INVENTOR(S)  : Shimizu et al.

It is certified that error appears in the above-identified patent and that said Letters Patent is hereby corrected as shown below:

Title page,  
Under the section titled U.S. PATENT DOCUMENTS, insert the following:

| | | | |
|---|---|---|---|
| -- 5,716,593 | Feb. 1998 | Miller | 423/716 |
| 5,558,851 | Sep. 1996 | Miller | 423/716 |
| 5,474,754 | Dec. 1995 | Saxton et al. | 423/705 |
| 4,587,115 | May. 1986 | Arika et al. | 423/700 |
| 5,427,765 | Jun. 1995 | Inoue | 423/705 |
| 4,560,542 | Dec. 1985 | Robson | |
| 4,058,586 | Nov. 1977 | Chi et al. | |
| 3,594,121 | Jul. 1971 | Weber | |
| 3,574,539 | Apr. 1971 | Domine et al. | |
| 3,367,886 | Feb. 1968 | Haden et al. | |
| 3,314,752 | Apr. 1971 | Kerr | |
| 3,306,922 | Feb. 1967 | Barrer et al. | |
| 3,100,684 | Aug. 1963 | Haden et al. --. | |

Signed and Sealed this

Fifth Day of March, 2002

Attest:

JAMES E. ROGAN  
*Attesting Officer*  *Director of the United States Patent and Trademark Office*